Nov. 28, 1944. T. J. COSTA 2,363,573
ARMOR SHELL FOR MOTOR VEHICLES
Filed April 4, 1942
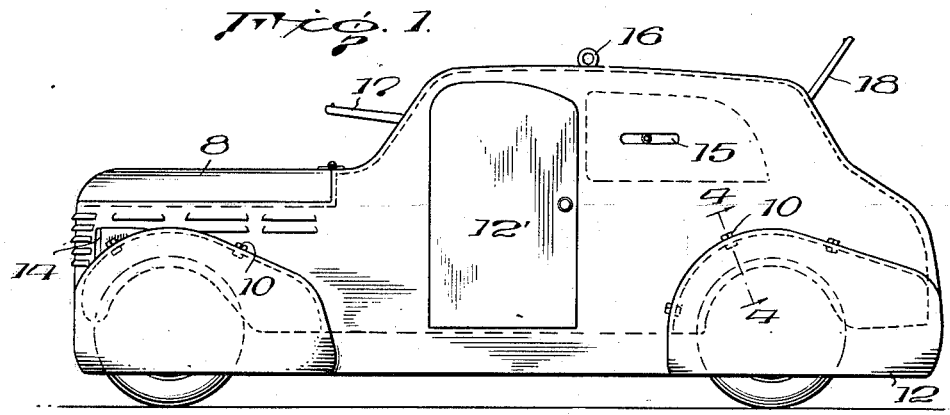
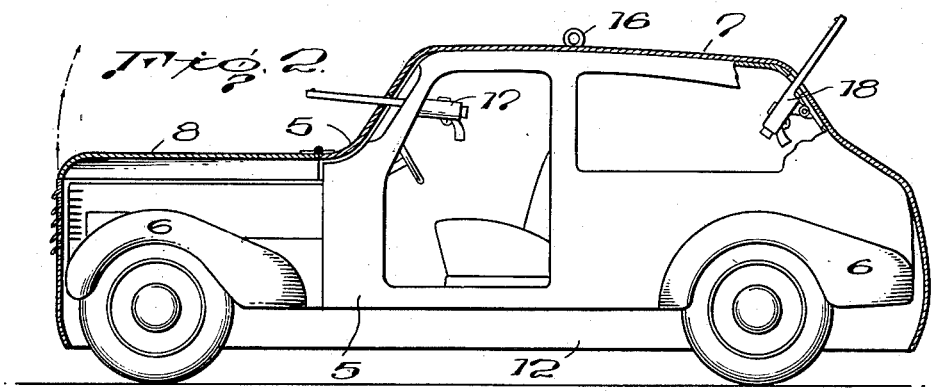
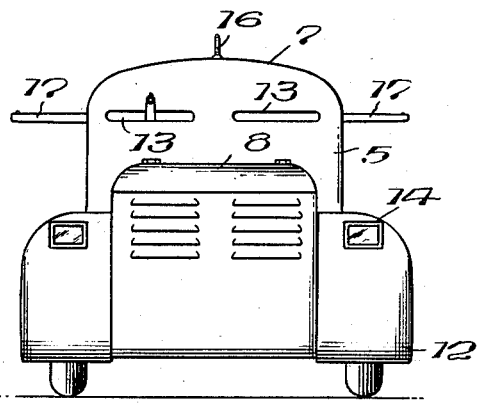
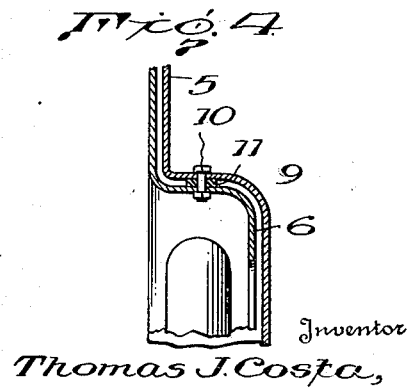
Inventor
Thomas J. Costa,
By Bernard Z. Harvey
Attorney Patented Nov. 28, 1944

2,363,573

UNITED STATES PATENT OFFICE 2,363,573

ARMOR SHELL FOR MOTOR VEHICLES

Thomas J. Costa, Teaneck, N. J.

Application April 4, 1942, Serial No. 437,697

1 Claim. (Cl. 89—36)

The present invention consists of an armor shell for a motor vehicle, an object of which is to equip conventional types of motor vehicles, especially passenger automobiles, with a protective shell which is capable of quick application and may be secured to the vehicle without the aid of special tools, the shell being adequate to protect the vehicle from damage and its passengers from injury by shrapnel and other missiles resultant from the droppage of bombs, and the discharge of firearms.

The shell is of course adapted for use on private as well as public vehicles and is slidably engageable with the vehicle from suitable suspension means under which the vehicle may be operated, preparatory to said engagement, after the vehicle has been stripped of its hood, doors and all glass or other frangible parts or accessories not essential for operation of the vehicle.

Other objects of the invention will be apparent from the following description of the preferred form of the invention taken in connection with the accompanying drawing, wherein Fig. 1 is a side elevational view of an armor shell constructed in accordance with the present invention, illustrating its application, Fig. 2 is a longitudinal sectional view of the same, a portion thereof and of the enveloped vehicle being broken away to disclose details, Fig. 3 is a front elevational view of the shell applied to the vehicle, and Fig. 4 is a detail fragmentary sectional view taken on the line 4—4 of Fig. 1, showing to advantage the manner of connecting the shell to a fender of the vehicle.

In order to illustrate the application of this invention, a motor vehicle 5 is shown, which is of standard or conventional design having the doors, windows and engine hood removed therefrom. It is essential that all glass and other frangible parts or appurtenances be removed from the vehicle. Since the device of the present invention is especially adapted for use on passenger vehicles, the drawing shows a passenger car of the two door type. The vehicle includes front and rear fenders 6 to which the shell may be secured in a manner more fully hereinafter set forth.

The shell constructed in accordance with the present invention is generally designated 7 and made of suitable material to resist bomb splinters, shrapnel and bullets. The shell conforms in shape generally to the contour of the vehicle, the top of the shell fitting snugly over and embracing the top of the vehicle. The front of the shell extends over and rests on the cowl of the vehicle, the cowl portion of the shell being hingedly engaged with a closure 8 through which access may be gained to the vehicle engine. The rear of the shell conforms to the shape of the rear of the vehicle in order to envelope the body protrusion at the rear, trunk, or the like, customarily forming a part of or being attached to the rear of the vehicle body.

The sides of the shell are formed to provide fender parts 9 which are bolted or otherwise fixedly secured to the vehicle fender 6 by bolts or other suitable means 10. Of course the fender parts 9 of the shell and fender 6 may be spaced by fiber washers or other suitable cushioning means 11. Below the fender parts 9 the shell extends downwardly at the sides, as well as at the front and rear considerably below the wheel axles to provide a skirt portion 12, as shown to advantage in Fig. 2.

The shell is provided at its sides with an opening through which access is gained to the vehicle, the opening being covered by a door 12' as shown in Fig. 1. An opening may of course be provided in the shell to permit access to be gained to the fuel tank.

It is to be understood that the weight of the shell is to be equally distributed over the vehicle and is consequently constructed so as to find support on the vehicle top, on the cowl, on the rear of the vehicle and on the four fenders. This equal distribution of the weight permits operation of the vehicle in a normal manner.

The front of the shell, above the cowl may be provided with side openings 13. Also the front fender parts are formed to provide light casings 14, to make available black-out lights for the vehicle. In addition, the sides and rear of the shell may be formed to provide gun slots 15.

In view of the weight and necessary bulk of the shell, it must be engaged with and disengaged from the vehicle by suitable hoist mechanism, and consequently the shell is equipped with an eye 16, preferably extended from the top or roof of the shell, which may be quickly engaged with a hook or other part of a hoist.

Although the shell is not primarily designed for use on a combatant vehicle, or as a combatant vehicle, nevertheless it is so formed that guns, mounted in the vehicle may be operated through the shell. As illustrated to advantage in Fig. 2, a gun 17 may be suitably mounted in the front of the vehicle, on or above the instrument board, in convenient accessibility to a person located on the front seat. This is so positioned that it would at no time be in the way of or objectionable to the operator while operating the vehicle. Guns 17 may be mounted so that the barrels thereof can be extended through slots 15 at the sides of the shell and moved to attack a moving target or a stationary target while the vehicle is in motion, or both vehicle and target in motion.

Also it is within the contemplation of this invention to employ antiaircraft guns 18 in any part of the vehicle. I have, in the present instance, shown a gun mounted back of the rear seat, so that the barrel will project through the shell at a point just beyond the angle or jointure of the roof of the vehicle top and the back of the latter, to permit shrapnel and the like to be shed from the roof without much likelihood of entering the vehicle.

It is of course to be understood that I have herein illustrated and described only a preferred embodiment of this invention. I am of course aware that various changes may be made in the details of construction, proportion and arrangement of parts, within the scope of the claim of the present invention. Furthermore, modifications such as conveniently located sights for the operator and occupants of the vehicle, cushioning and protective means between the shell and vehicle, etc., may be employed without departing from the scope of this invention.

What is claimed is:

In combination with a passenger motor vehicle of standard construction including a body with a top and fenders, the doors and windows of the body being removed to provide openings, a preformed armor casing shaped to conform to the outline of the body and completely enveloping the latter including the top and fenders, the casing having openings aligned with the window and door openings of the body, said casing resting on and supported by said top and fenders and being secured to said fenders.

THOMAS J. COSTA.